United States Patent [19]

Nagano

[11] 4,194,409
[45] Mar. 25, 1980

[54] FRONT DERAILLEUR FOR A BICYCLE PROVIDED WITH A SWINGINGLY MOVABLE CHAIN GUIDE

[75] Inventor: Masashi Nagano, Sakai, Japan

[73] Assignee: Shimano Industrial Company Limited, Osaka, Japan

[21] Appl. No.: 923,355

[22] Filed: Jul. 10, 1978

[30] Foreign Application Priority Data

Jul. 12, 1977 [JP] Japan .................. 52-92844

[51] Int. Cl.² ............................... F16H 9/00
[52] U.S. Cl. ................... 74/217 B
[58] Field of Search ................. 74/217 B

[56] References Cited

U.S. PATENT DOCUMENTS

| | | | |
|---|---|---|---|
| 3,974,707 | 8/1976 | Nagano | 74/217 B |
| 4,030,375 | 6/1977 | Nagano | 74/217 B |
| 4,037,484 | 7/1977 | Morse | 74/217 B |

Primary Examiner—James C. Mitchell
Attorney, Agent, or Firm—Stevens, Davis, Miller & Mosher

[57] ABSTRACT

A front derailleur for a bicycle pivotally couples a base member fixed to the frame of the bicycle, two linkage members, and a movable member having a chain guide mounted thereon which together constitute a four-connected component linkage mechanism. When a bicycle speed change is made, the movable member moves relative to the base member such that the chain guide component swingingly moves with the amount of movement of the chain guiding portion of the chain guide being larger than the amount of movement of the movable member.

8 Claims, 4 Drawing Figures

FRONT DERAILLEUR FOR A BICYCLE PROVIDED WITH A SWINGINGLY MOVABLE CHAIN GUIDE

BACKGROUND OF THE INVENTION

This invention relates to a front derailleur for a bicycle which is located near a multistage front sprocket means comprising at least two sprocket wheels arranged in parallel, each having a different number of teeth and teeth spacing, and which is used for shifting a drive chain to one of the sprocket wheels. The multistage front derailleur is conventionally comprised (FIG. 4) of a base member 1, linkage members 2, 3 and a movable member 4 having a chain guide 5 mounted thereon, each of these members being coupled with pins P1, P2, P3 and P4 to constitute a parallel moving chain guide coupled to a four component linkage mechanism with these pins as supporting points. The linkage mechanism and associated chain guide 5 are so constructed that the chain guide moves in parallel with respect to the bicycle along the axial direction of the multistage front sprocket means 6 during the movement of the movable member 4. When a chain C is shifted by the chain guide 5, an overshifting operation is required beyond a shift quantity which is necessary for shifting the chain C, and a user who is not accustomed to the overshifting operation may not perform speed changes smoothly.

To further describe the problem, when a chain C is shifted from a small-diameter sprocket 61 on the low-speed side of the front sprocket means 6 to a large-diameter sprocket 62 on the high-speed side of the front sprocket means or vise versa, the shifting movement of the chain C by the chain guide 5 is made somewhat larger than the space between the sprockets 61 and 62. In other words, an overshifting operation in which the shifting movement of the chain C by the chain guide 5 is made slightly larger than the distance between the sprockets 61 and 62 is performed to provide a reliable and smooth shifting of the chain C with respect to the sprocket 61 or the sprocket 62. However, since the chain guide 5 moves parallel to the bicycle in the conventional front derailleur, when the parallel movement of the chain guide 5 is set larger than the movement of chain C, it must be returned by the amount of overshift after the chain has been shifted to a given sprocket 61 or 62. When it is not returned by the amount of the overshift, the chain C is pressed in the shift direction by the chain guide 5 and remains biased in the shift direction with respect to the sprocket 62 or the sprocket 61. Therefore, if the amount of shifting movement of the chain C is made larger to improve the speed change performance, a problem occurs in that the chain C is likely to be disengaged from the sprocket 62 or the sprocket 61 unless a restoring operation is performed. Furthermore, without the overshift correction, the chain C always comes into sliding contact with the inner side of a face of the chain guide 5, thus causing problems with respect to the durability of the chain guide and noise which is created by the contact of the chain C with the chain guide.

The present invention is designed to overcome the above noted disadvantages of the conventional front derailleur. Thus, an object of this invention is to provide a front derailleur wherein the chain guided by the chain guide is moved by an amount required for shifting with respect to the multistage front sprocket stage without requiring or introducing overshift during the speed change operation to perform a smooth and reliable shifting from one sprocket to another of the sprocket means. The present invention also reduces the amount of noise generated and the wear on the chain guide.

Briefly, the invention achieves the foregoing objects by providing a front derailleur comprising a base member; two linkage members pivoted on the base member; and, a movable member pivoted to the two linkage members and having a chain guide mounted thereon. All four members are pivotally coupled through pins at the ends of the two linkage members and at the base member. The base member, two linkage members, and the movable member constitute a non-parallel chain guide moving four-connected component linkage mechanism in which a swinging movement imparted to the chain guiding portion of the chain guide is larger than the movement of the moving member connected therewith when the moving member moves with respect to the base member in the axial direction of the sprocket means, whereby the chain is reliably shifted without any overshift.

In a further description of the invention, the chain guide is arranged to have a chain guiding portion swingingly moved around a fixed position on the movable member during the motion of the movable member through an approximately fan-shaped track. When the chain is shifted to one sprocket of the sprocket means, the chain can be guided to the desired sprocket through the swinging motion of the chain guiding portion without any overshift. As a result, the shifting of the chain to the sprocket can be performed reliably and smoothly.

Other objects and novel characteristics of the invention will be apparent from the description of the embodiment in accordance with the accompanying drawings.

BRIEF DESCRIPTION OF THE DRAWINGS

FIG. 1 shows the entire driving mechanism for a bicycle with a speed change gear. Numeral 6 indicates a multistage front sprocket means comprising a low-speed-side small-diameter sprocket 61 secured to a crank 7 of the bicycle and a high-speed-side large-diameter sprocket 62. Numeral 8 indicates a multistage rear sprocket means to be mounted on the rear wheel hub (not shown) of the bicycle. A chain C is entrained between respective sprockets of sprocket means 6 and 8. A rear derailleur 9 is mounted, adjacent to the sprocket means 8, on the multistage rear sprocket means 8. The front derailleur 10 of the invention is mounted, adjacent to the means 6, on the multistage front sprocket means 6. The chain C is shifted to one sprocket in both sprocket means 6 and 8 through the operation of derailleurs 9 and 10 to perform the multistage speed changes.

Figure 1:
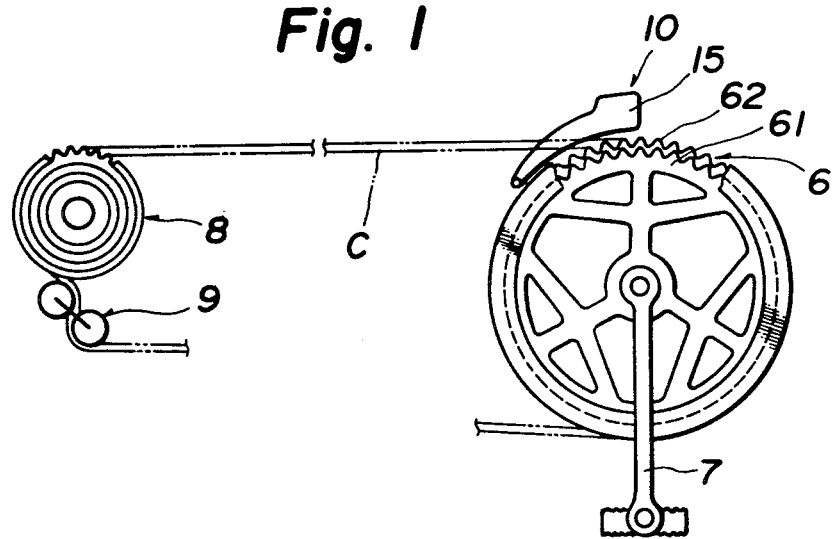
FIG. 1 is a schematic side view showing an entire driving mechanism in a bicycle with a speed change gear.

The front derailleur of this invention is used as described hereinabove and is further illustrated in FIGS. 2 and 3. As shown therein, the front derailleur of this invention is composed of a base member 11 secured to the frame F of the bicycle, two linkage members 12 and 13 each having a first end portion and a second end portion, and a movable member 14 having a chain guide 15 connected therewith. The two linkage members 12 and 13 pivotally connect at their first end portions, through respective first and second pins P1 and P2, with the base member 11. The movable member 14 pivotally connects to the second end portions of the linkage members 12 and 13 respectively through a third pin P3 and a fourth pin P4 to form the linkage mechanism. In the linkage mechanism, the length 12 between the third pin P3 and the fourth pin P4 is made larger than the length 11 between the first pin P1 and the second pin P2 to constitute a linkage mechanism in which the chain guide moves swingingly and not parallel to the bicycle frame with the pins P1 to P4 being disposed as support points.

The base member 11 has a tightening band 16 for securement to the frame F and is secured to the frame F by a bolt/nut means 17. The tightening band 16 has an outer receiver 20 for supporting an outer tube 19 of a control cable, which comprises an inner wire 18 for moving the movable member 14 and an outer tube 19 for guiding the wire 18.

One linkage member 13 has its first end portion extended from the support position of the second pin P2 and a fixture 21 mounted on the tip end of the extended portion for securing the inner wire 18. The two adjustment screws 22 and 23, which restrict the swinging range of the linkage member 13, and therefore the moving range of the moving member 14, are mounted on the linkage member 13 to make it possible to adjust the moving range.

Figure 2:
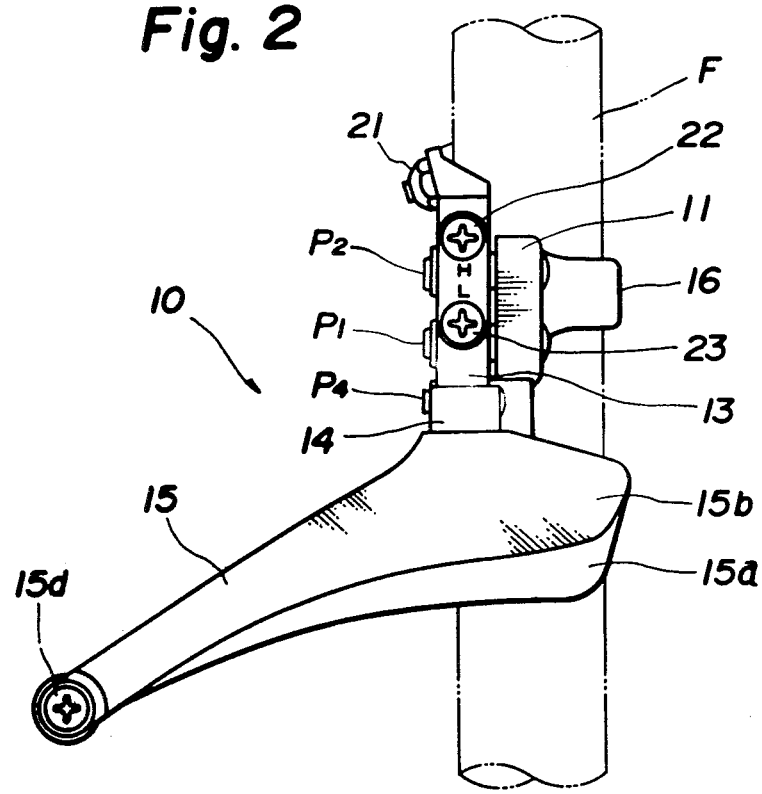
FIG. 2 is a front view, in one embodiment, of a front derailleur of the invention.

As is apparent from FIG. 2, a chain guide 15, mounted on the movable member 14, comprises two guide plates 15a and 15b each having a front face of approximately semiellipic shape and a tapering rear face. Both of the guide plates 15a and 15b are oppositely spaced to form a guide space having a width larger than the width of the chain C. One end of the space between the guide plates 15a and 15b is bound by a coupling plate 15c which is secured to the movable member 14. A coupling shaft 15d couples the other ends of the guide plates 15a, 15b. As shown in FIG. 3, the chain guide 15 guides the chain C which is inserted between the guide plates 15a and 15b. When the base member 11 is secured to the frame F as shown in FIG. 3, the guide plates 15a, 15b are vertically supported.

As shown in the drawings, where the chain guide 15 is mounted on the frame F, the lower portions of the guide plates 15a and 15b are inclined with respect to the upper portions thereof, which are mounted to the movable member 14, so as to diverge away from the sprocket means 6. In further detail, when the chain C is disposed on the low-speed-side small-diameter sprocket 61 of the multistage front sprocket means 6, as shown in a solid line of FIG. 3, the lower sides of the guide plates 15a and 15b are inclined in shape to diverge away from the high-speed-side large-diameter sprocket 62. This causes the chain C to be guided more effectively, due to the swinging motion (described later) during the speed change operation of the chain guide 15. However, chain guide 15 may be made vertical, without any inclination as in the conventional front derailleur shown in FIG. 4.

Figure 3:
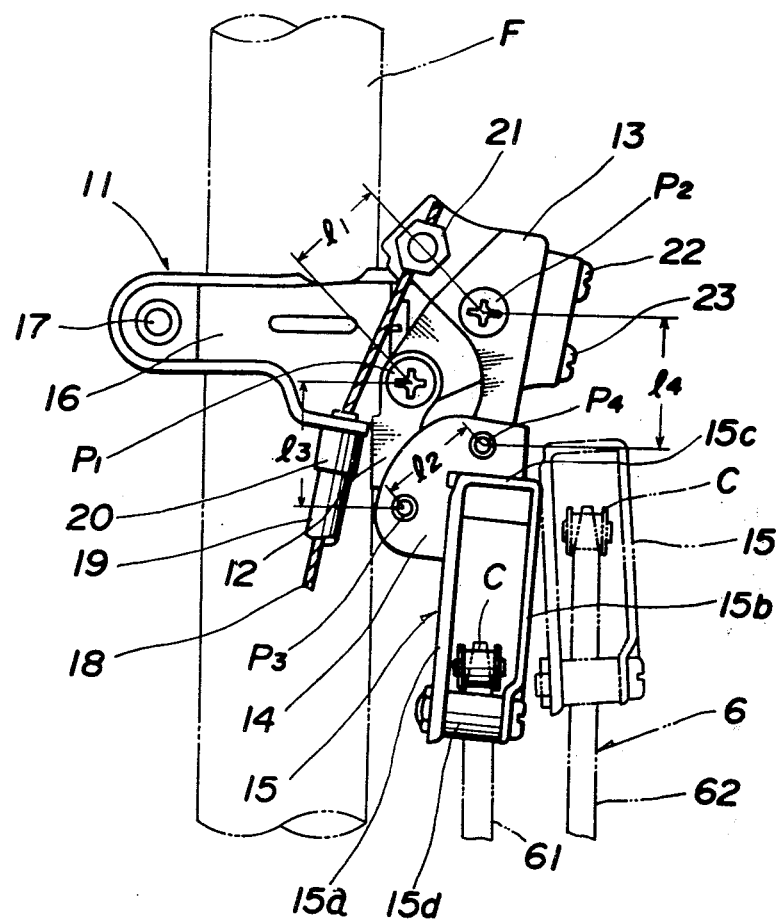
FIG. 3 is a rear view of the embodiment.
Figure 4:
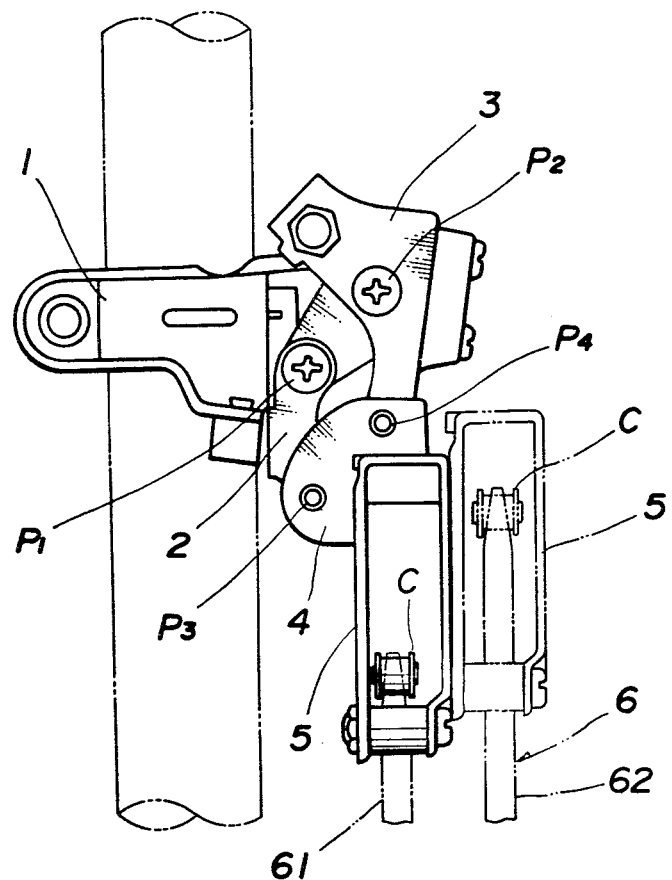
FIG. 4 is a rear view of a conventional front derailleur.

In the construction shown in FIG. 3, the length 13 between the pins P1 and P3 is set to be equal to the length 14 between the pins P2 and P4. Conventional front derailleur dimensions may be used for these lengths such that, for example, the lengths 13 and 14 are set to 20 through 22 m respectively. The length 11 is set to 17 or 18 mm and the length 12 is set to 20 to 22 mm.

In the embodiment shown in FIG. 3, 11<12 and, as noted, 13=14; however, an 13<14 or an 13>14 may be used as long as 11<12. Also, 13<14 may be used if 11=12.

A four-connected component linkage mechanism composed of the base member 11, the linkage members 12, 13 and the movable member 14 is made into a non-parallel four-connected component linkage mechanism. The amount of movement of the chain guiding portion of the chain guide 15 during the moving operation of the movable member 14 is made larger than the amount of movement of the movable member 14.

Typical operation of this mechanism is as follows. A speed change lever (not shown) is operated to pull an inner wire 18 which is coupled to the linkage member 13. As a result, the above described non-parallel four-connected component linkage mechanism is deformed from a rest state. As the movable member 14 moves upon movement of lever 13, the chain guide 15 swingingly moves, describing an approximately fan-shaped track around its upper position. Accordingly, when the chain C is shifted from the low-speed-side small-diameter sprocket 61 of the multistage front sprocket means 6 to the high-speed-side larger-diameter sprocket 62, the amount of movement of the lower end side of the chain guide 15 which is the chain guiding portion, becomes larger than the amount of movement of the movable member 14. As shown in FIG. 3, under the condition where the chain C is entrained on the low-speed-side small-diameter sprocket 61 of the multistage front sprocket means 6, the chain guide 15 is inclined in shape to have its lower end side diverge farther away from the high-speed-side large-diameter sprocket 62 as shown in a solid line of FIG. 3. Under the condition where the chain C is entrained on the high-speed-side large-diameter sprocket 62, the chain guide 15 is adapted to be inclined in an opposite direction as shown in the dotted lines of FIG. 3.

When the chain C is shifted from the low-speed-side small-diameter sprocket 61 to the high-speed-side large-diameter sprocket 62, the chain C can be moved with the same amount of movement as previously used in the overshifting operation associated with conventional front derailleurs through guidance of the lower end side portion of chain guide 15; that is, a larger chain moving quantity in the chain guide 15 is achieved without the excessive movement (overshift) of the speed change lever (not shown) to excessively move the movable member 14. In addition, since the chain guide 15 as described above performs its swinging motions, it serves to scoop up the chain C, by its inner side face, towards the adjacent side of the high-speed-side large-diameter sprocket 62 to thereby move the chain C while depressing it.

With the foregoing construction, the speed change performance is improved. Fine speed change adjustments restoring excessive movements of the chain when the chain has ridden onto the high-speed-side large-diameter sprocket after the movable member 14 had moved excessively to overshift the chain are not required. A reliable and smooth speed change can be effected and the chain is not disengaged from a sprocket due to a failure to restore the chain guide position or delayed timing of the restoring operation by the operator.

In addition, since the movement on the upper end side of the chain guide 15 is small and is approximately the same as the length between the sprockets 61 and 62, the chain C does not come into a forcefull sliding contact against the chain guide 15 where the chain C has ridden onto the high-speed-side large-diameter sprocket 62. Thus, improved service life of the chain guide 15 is achieved by the reduction in abrasion, and objectionable noise is not produced.

When the chain C is shifted from the high-speed-side large-diameter sprocket 62 to the low-speed-side small-diameter sprocket 61, the chain guide 15 swings from the inclined position shown in the dotted lines of FIG. 3 to the inclined position shown in the solid lines of FIG. 3. Thus, the chain C which is disengaged from the high-speed-side large-diameter sprocket 62 and drops into position, is guided towards the adjacent side of the low-speed small-diameter sprocket 61.

As described above, according to this invention, the length l2 between the pin P3 and the pin P4 is made larger than the length l1 between the pin P1 and the pin P2. The invention improves the change performance of a multistage front gear while preventing chain disengagement through an extremely simplified construction utilizing a non-parallel moving chain guide coupled to a four-connected component linkage mechanism.

Although a particular embodiment of the invention has been shown for the purposes of description, it should be understood that it is merely exemplary and that changes and modifications can be made thereto without departing from the spirit and scope of the invention which is limited only by the following claims.

What is claimed is:

1. A front derailleur for a bicycle which is adapted to shift a chain between different diameter sprockets of a front sprocket assembly comprising: a base member secured to the frame of a bicycle, two linkage members each having a first end portion and a second end portion, and a movable member with a chain guide mounted thereon, said two linkage members having their first end portions pivotally connected with said base member, and said movable member being pivotally connected with the second end portion of each linkage member such that said base member, two linkage members and movable member are pivotably coupled to constitute a four-connected component linkage mechanism which swingingly moves said chain guide in a non-parallel relation with respect to said bicycle frame, the amount of movement of a chain guiding portion of said chain guide being larger than the amount of movement of said movable member with respect to the base member in the axial direction of the sprocket assembly.

2. A front derailleur for a bicycle according to claim 1, wherein said chain guide comprises two opposite guide plates disposed to form a space between them having a width larger than the width size of said chain, said chain guide being adapted to guide a chain inserted between said guide plates.

3. A front derailleur for a bicycle according to claim 2, wherein each of the guide plates of said chain guide is vertically supported when the base member is secured to the frame, and each has a lower portion which, in relation to its upper portion is inclined to diverge away from said sprocket means.

4. A front derailleur for a bicycle according to claim 1, wherein the length between a first pin and a second pin by which the first end portion of each of the linkage members is pivotally supported on the base member is less than the length between a third pin and a fourth pin by which the movable member is supported on the second end portion of each linkage member.

5. A front derailleur for a bicycle according to claim 4, wherein the length between said first and third pins is equal to the length between said second and fourth pins.

6. A front derailleur for a bicycle according to claim 4, wherein the length between said first and third pins is less than the length between said second and fourth pins.

7. A front derailleur for a bicycle according to claim 4, wherein the length between said first and third pins is greater than the length between said second and fourth pins.

8. A front derailleur for a bicycle according to claim 1, wherein the length between a first pin and a second pin by which the respective first end portions of each of the linkage members are supported on the base member is equal to the length between a third pin and a fourth pin by which the second end portions of each of the linkage members are supported on the movable member, and the length between said first pin and said third pin, is less than the length between said second pin and said fourth pin.

* * * * *